Sept. 27, 1955    H. J. JONES    2,718,843
COFFEE BREWER
Filed Sept. 30, 1950    5 Sheets-Sheet 1
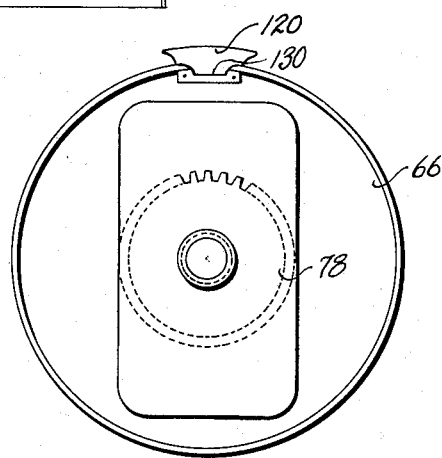
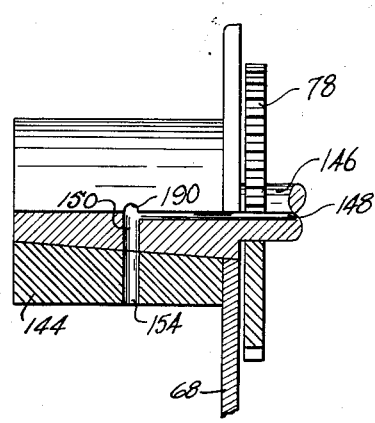
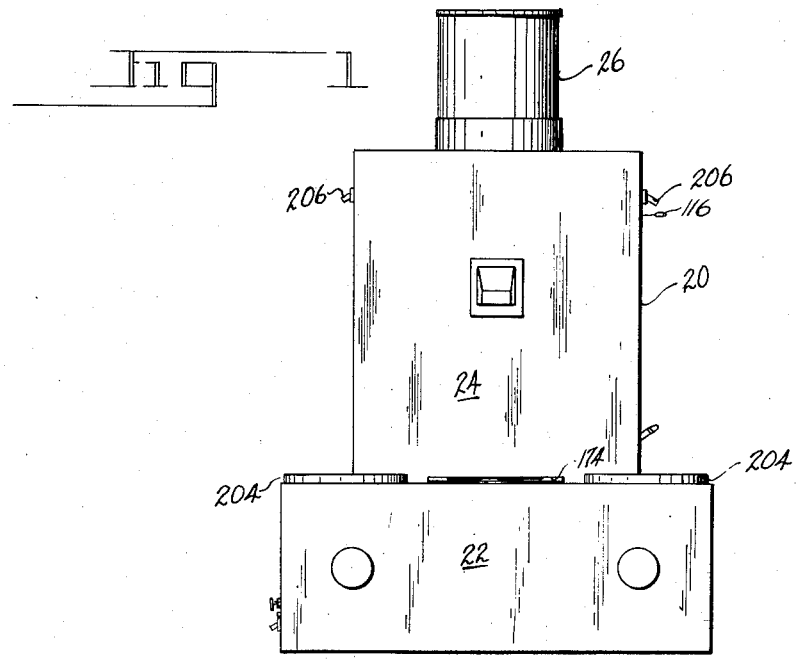
INVENTOR.
HUGH J. JONES
BY Edward M. Shealy
Attorney Sept. 27, 1955　　　　　　　H. J. JONES　　　　　　2,718,843
COFFEE BREWER
Filed Sept. 30, 1950　　　　　　　　　　　　5 Sheets-Sheet 2
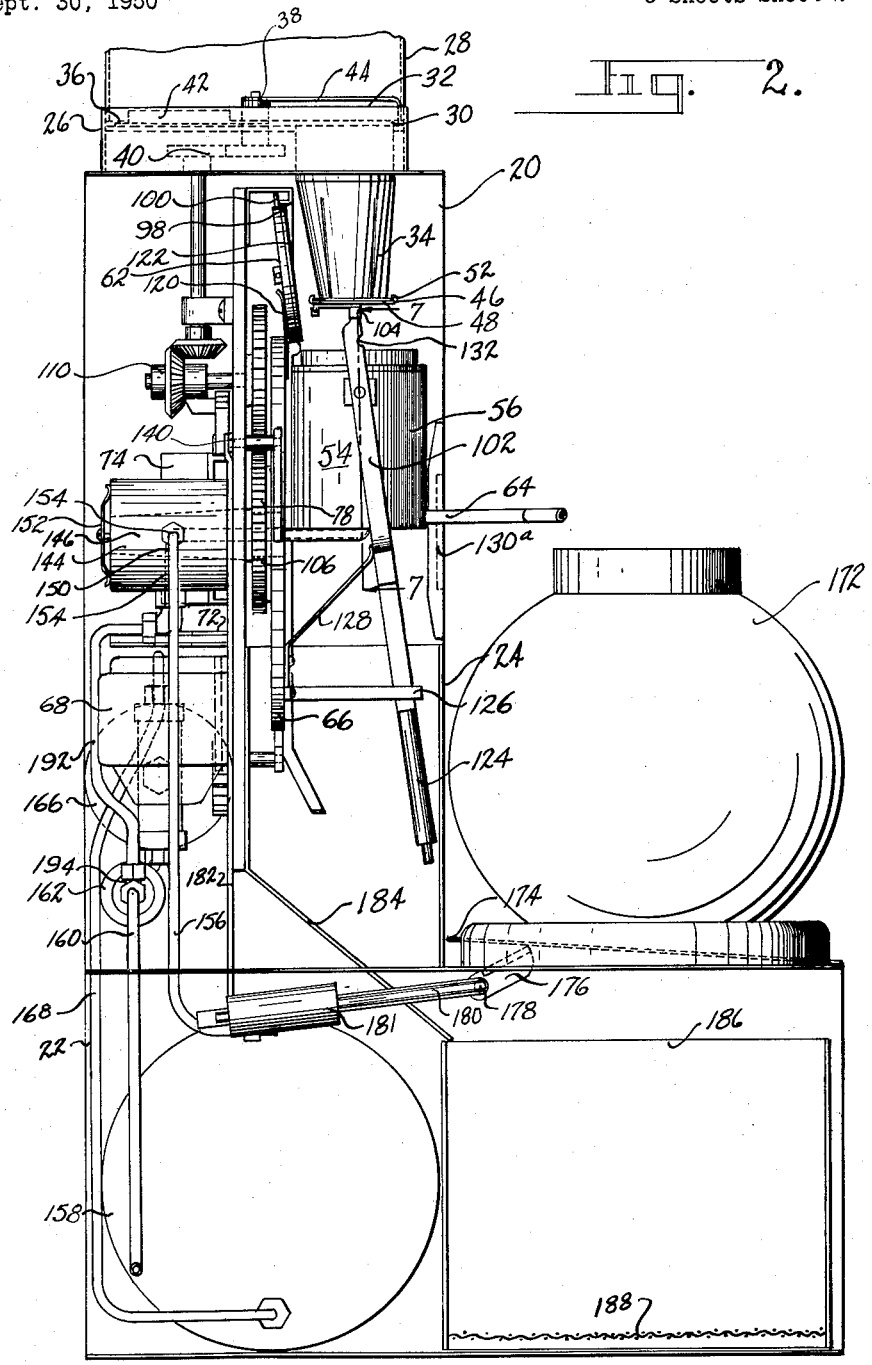
INVENTOR.
HUGH J. JONES
BY Edward M. Shealy
Attorney Sept. 27, 1955 H. J. JONES 2,718,843
COFFEE BREWER
Filed Sept. 30, 1950 5 Sheets-Sheet 3
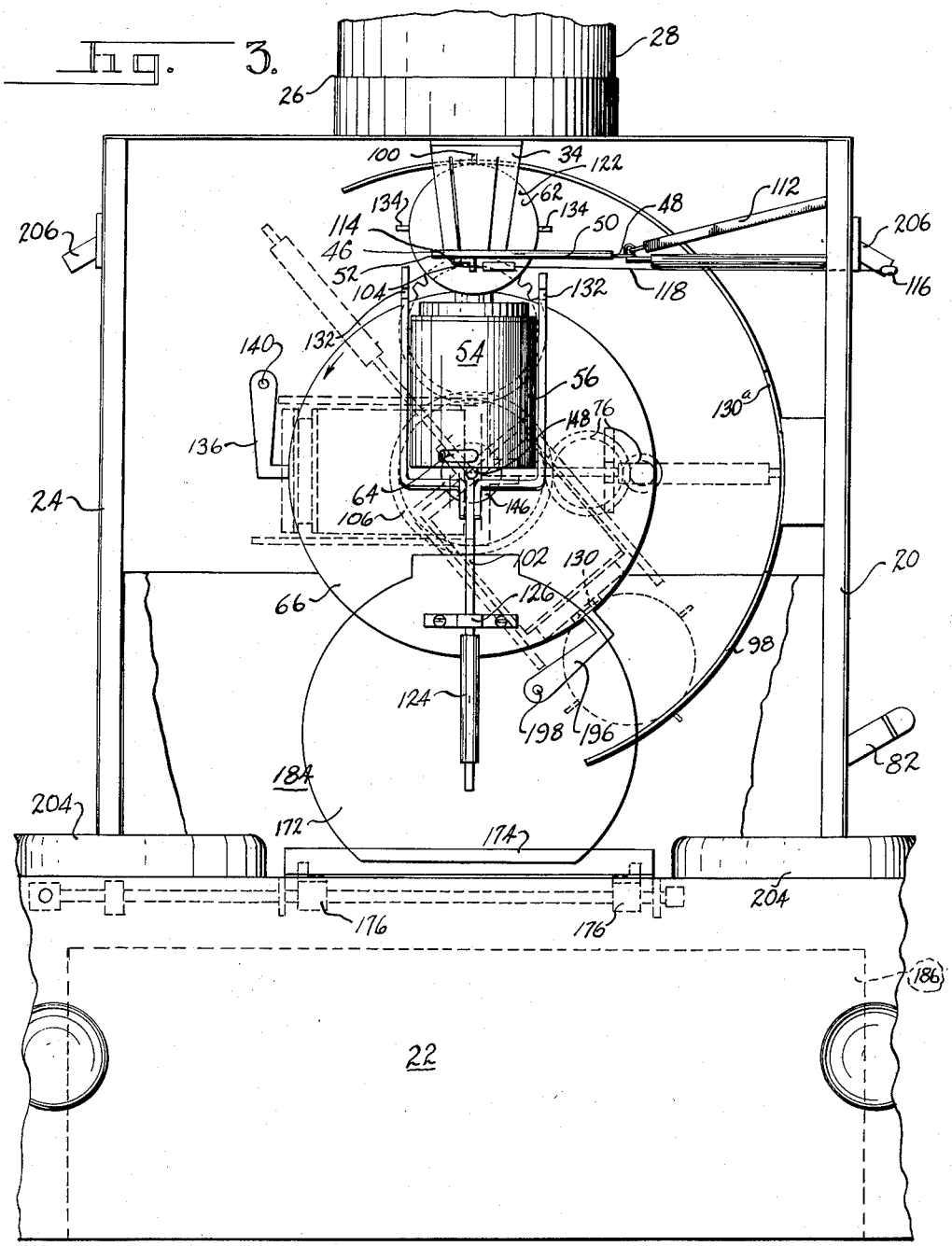
INVENTOR.
HUGH J. JONES
BY Edward M. Shealy
attorney

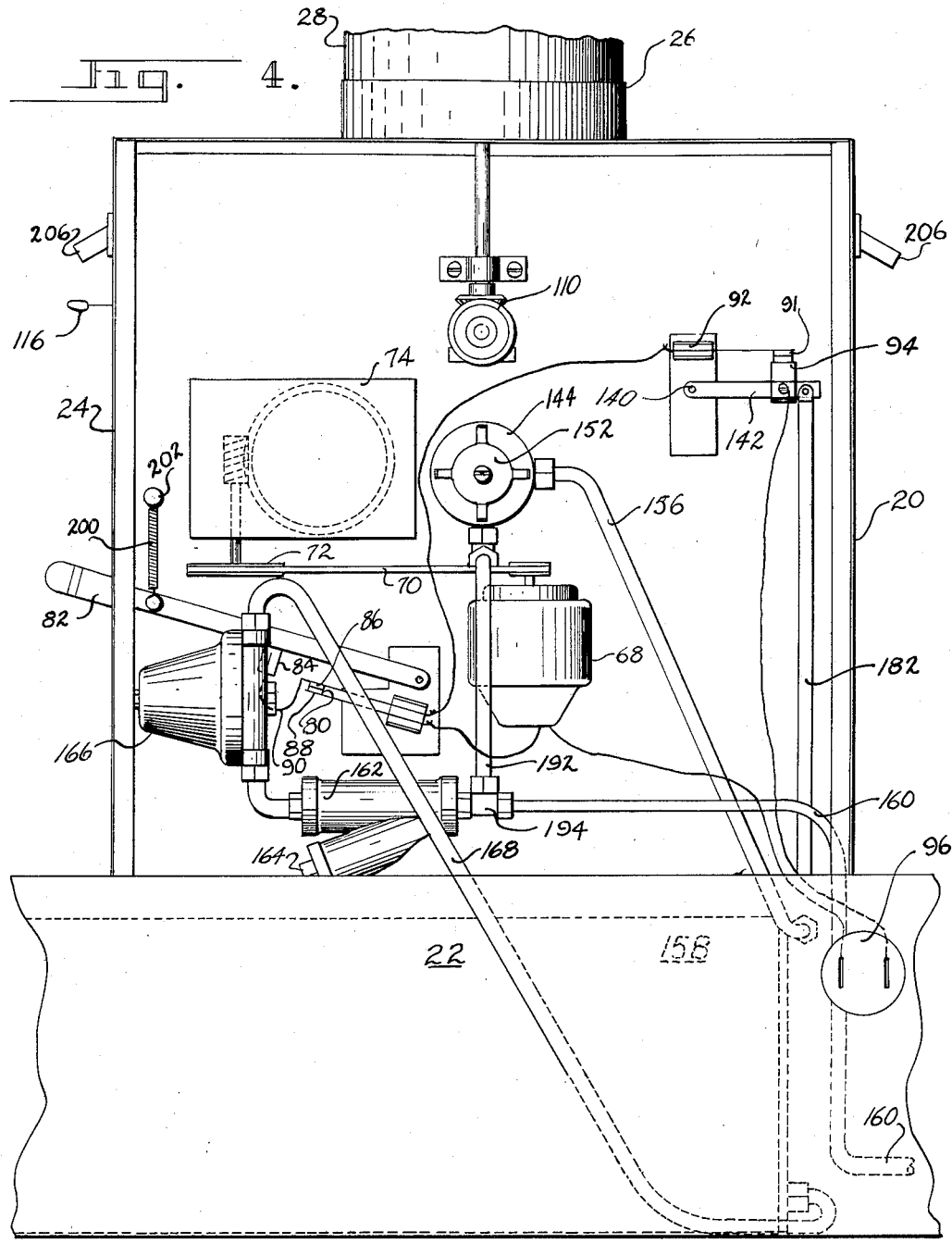

Sept. 27, 1955
H. J. JONES
2,718,843
COFFEE BREWER
Filed Sept. 30, 1950
5 Sheets-Sheet 5
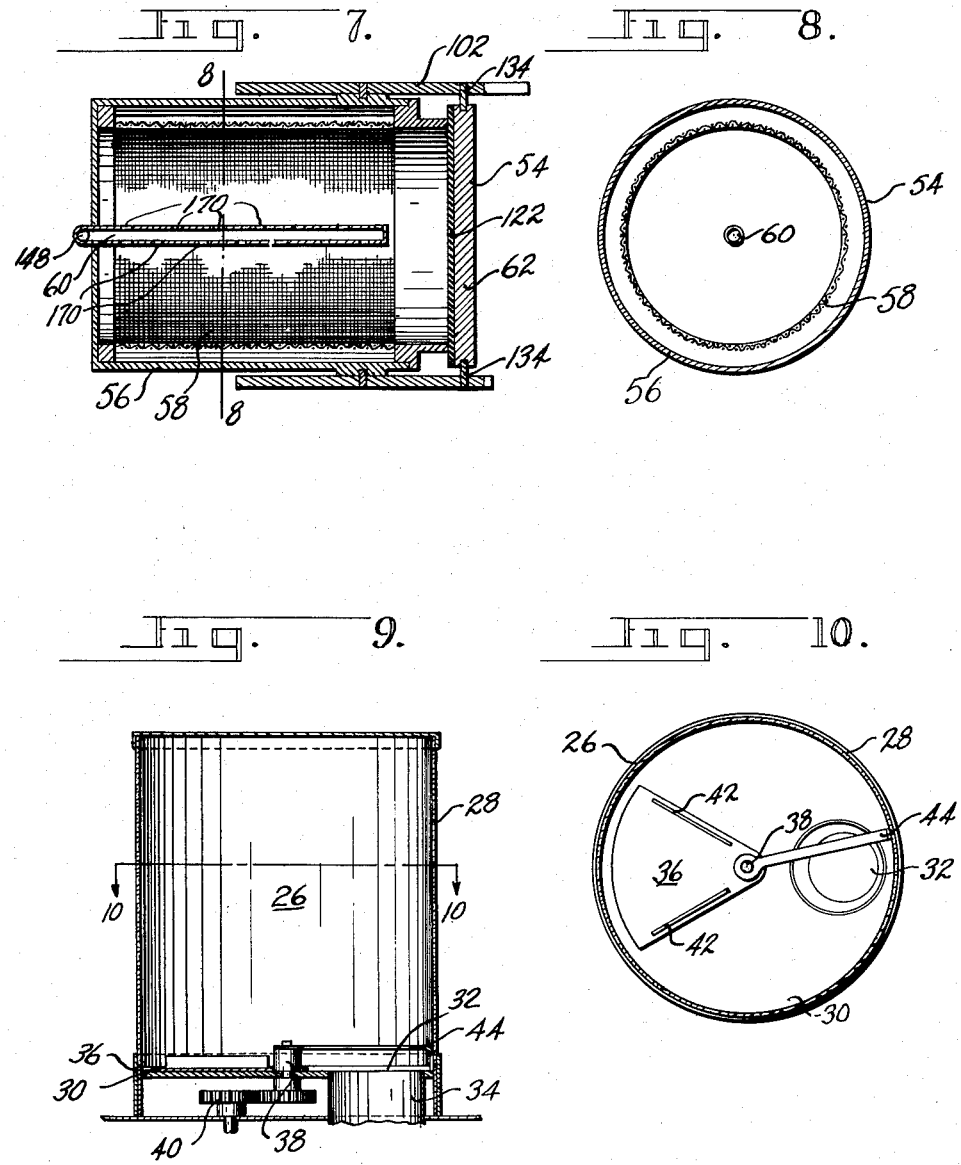
INVENTOR.
HUGH J. JONES
BY Edward M. Shealy
   Attorney

United States Patent Office 2,718,843
Patented Sept. 27, 1955

2,718,843

COFFEE BREWER

Hugh J. Jones, Salt Lake City, Utah, assignor to Brumat Corporation, Salt Lake City, Utah, a corporation of Utah Application September 30, 1950, Serial No. 187,772

10 Claims. (Cl. 99—289)

The present invention relates to devices useful in brewing coffee and more especially the present invention is concerned with devices of the type described which are automatic in operation.

One object of the present invention then is to provide a device of the character described which will be relatively simple in construction and highly efficient in operation.

Another object of the present invention is to provide a device of the character described which will be entirely automatic in operation and which will require a minimum amount of attention by the user.

Still another object of the present invention is to provide a device of the character described which will automatically clean itself.

Yet another object of the present invention is to provide a device of the class described which will be extremely economical in operation and which will make more cups of coffee per pound of coffee used than devices in present day use.

Another object of the present invention is to provide a device of the character described which may be readily adapted for use in vending machines and the like.

Another object of the present invention is to provide a device of the class described which will have an extremely attractive appearance and which will be neat and easy to keep clean.

Still another object of the present invention is to provide a device of the class described with which the operator with a definite amount of ground coffee can produce brewed coffee of any desired strength.

Yet another object of the present invention is to provide a device of the character described which utilizes an entirely new and novel principle for brewing coffee, and a device which is simple in construction, highly efficient in operation, and which will be economical to manufacture.

With the above and other objects in view as will appear as the description proceeds, the invention resides in the novel construction, combination and arrangement of parts, and the novel methods employed, as hereinafter more specifically set forth, claimed and shown in the accompanying drawings which form a part of this application for Letters Patent.

In the accompanying drawings which form a part of this application for Letters Patent I have illustrated preferred and practical embodiments of the invention, it being understood, however, that the drawings are merely illustrative and that my inventive concept is susceptible of various other modifications and embodiments, and that the illustrated embodiments likewise are susceptible of a wide variety of modifications without departing from the spirit of my invention or the scope of the sub-joined claims.

In the drawings which accompany and form a part of this specification, and in which like reference numerals are used to designate the same or like parts throughout the several figures:

Figure 1 is a front elevation of the new and novel coffee brewer of my invention;

Figure 2 is a side elevation view of the device shown in Figure 1, with the side cover plates removed to show the operating parts;

Figure 3 is a front elevation view of part of the machine shown in Figure 1 with portions thereof broken away to show the mechanism more clearly;

Figure 4 is a rear elevation view of a part of the machine shown in Figure 1 with the rear cover plate removed;

Figure 5 is a detail view showing a portion of the mechanism of the new and novel coffee brewer of my invention;

Figure 6 is a detail view in section showing a rotary valve of the mechanism;

Figure 7 is a detail view in section of the container mechanism in which the coffee is brewed taken along the line 7—7 of Figure 2.

Figure 8 is a detail view in section of the container mechanism in which the coffee is brewed taken along the line 8—8 of Figure 7;

Figure 9 is a detail view, partially in section of the coffee feeder mechanism of the invention; and, Figure 10 is a sectional view of the coffee feeder mechanism of the invention taken along the line 10—10 of Figure 9.

Referring now in detail to the drawings, the reference numeral 20 has been used to generally designate the coffee brewer of my invention. It is to be understood that coffee is to be construed broadly as including any other or equivalent solids. The coffee brewer apparatus consists essentially of a base section 22, a section containing the mechanism in which the coffee is brewed and which has been designated generally by the reference numeral 24, and a coffee dispenser section 26 at the top of the device, as is shown most clearly in Figure 1. The device may be made from any suitable material, such as, for example, stainless steel, nickel or chrome plated material, plastic, or any other suitable material. In order to give the device a finished and attractive appearance as well as to make cleaning easier, the device may be enclosed by suitable covers which are made removable in order to provide ready access to the interior working mechanism of the coffee brewer 20.

In use, ground coffee which is to be brewed is first placed in a coffee dispenser 28 which forms a part of the coffee dispenser mechanism 26. Preferably the coffee dispenser is made from glass or plastic in order that the operator may readily determine when fresh coffee must be added to the coffee brewer. The bottom of the coffee dispenser 28 comprises a plate 30 having a suitable opening 32 therein, as is most clearly shown in Figures 2, 9 and 10. The opening 32 in the plate 30 communicates with a measuring cup 34 of suitable capacity. A cut-off 36 of suitable shape rotates above the plate 30 to cut off the flow of coffee to the measuring cup 34 at suitable times. The cut-off 36 is secured to a shaft member 38 which is driven by a suitable gear train 40 to cause it to rotate. The cut-off 36 may have suitable fin members 42 which serve to help the cut-off 36 to carry the coffee around to the opening 32 in the plate 30 where a fixed bar member 44 causes the coffee to drop into the opening 32, so that fresh supply of coffee is always available for the measuring cup 34.

The measuring cup 34 has slidably mounted cut-off 46 beneath it so that the measuring cup 34 will empty the coffee it holds in the mechanism in which the coffee is brewed at the proper time. The cut-off 46 consists essentially of a strip of material 48 having a suitable opening 50 therein, the said strip of material being slidably mounted in suitable guides 52.

The measuring cup 34 discharges its contents at the proper time into a suitable mechanism which has been generally designated by the reference numeral 54, for brewing the coffee. The coffee brewing mechanism 54 consists essentially of a cylindrical outer cup portion or other container 56 having a hinged cover 62 thereon and a suitable filter screen 58 mounted therein and suitably spaced from the inside walls of the cup 56. A perforated tube 60 which communicates with a source of hot water extends upwardly from the bottom of the cup 56 to complete the coffee brewing mechanism 54.

If desired, the operation of the new and novel coffee brewer of my invention may be automatic. Automatic operation of the device may be accomplished in the following manner. Ground coffee to be brewed is first placed in the coffee dispenser 28. The ground coffee flows by gravity through the opening 32 in the bottom plate 30 until it fills the measuring cup 34. The cut-off 46 at the bottom of the measuring cup 34 serves to hold the coffee in said measuring cup until the proper time for it to flow into the coffee brewing cylinder 54. The coffee brewing cylinder 54 is mounted on a revolving plate 66 which may be driven by suitable means, such as, for example, the electric motor 68 connected by means of a belt 70 and pulley 72 through a suitable reduction gear box 74 which drives the revolving plate 66 by means of a suitable train of gears 76 meshing with a gear 78 fixedly secured to the back of the revolving plate 66.

As illustrated, the machine begins its cycle of operations when the coffee brewing cylinder 54 is in a 5 o'clock position as compared with the face of a clock and with the plate 66 on which it is mounted, revolving in a counter-clockwise direction. Operation of the machine begins by closing an electrical switch 80 which may be done by any suitable means, such as, by depressing the handle 82 which is pivotally mounted on the back of the machine as is shown most clearly in Figure 4. When the handle 82 is depressed it pushes down the rider 84 causing the contact 86 to touch the contact 88 and thus closing the circuit. The contact 86 is carried by a spring member 90 which is normally biased upwardly against the handle member 82 as is most clearly shown in Figure 4, which permits the contacts 86 and 88 to be normally separated in open position until the handle 82 is depressed. It will be understood that while the invention has been illustrated and described in terms of manual operation of the handle 82 that the closing of the switch 80 could equally well be actuated by depositing a coin in the machine thus making it an automatic coffee vendor, or by suitable timing means which would close the switch 80 at desired intervals in order to automatically provide brewed coffee as desired. The contact 86 is electrically connected to contact 91 of a second switch 92 which is normally in closed position. The other contact 94 of the switch 92 is electrically connected to one terminal of a source of electrical current 96 such as, for example, the ordinary 110 A. C. household power supply. Closing of the switch 80 then causes current to flow through the motor 68, one side of which is connected to the other terminal of the source of electrical current 96, through the closed switch 80, through the closed switch 92 and then back to the other terminal of the source of electric current 96 so that there is a closed circuit through the motor 68 which causes it to rotate. Rotation of the motor 68 turns the belt 70 and the pulley 72 which in turn rotates the gear train 76 through the speed reduction box 74 and the gear train 76, causes the plate 66 to revolve, carrying with it the coffee brewing cylinder 54 which is fixedly secured thereto. As the coffee brewing cylinder 54 starts its travel upward, the already described hinged cover 62 on the top of the cup 56 is in open position and is held in this open position by means of a semi-circular guide track 98. A pin 100 fixedly secured to the top of the hinged cover 62 rides behind the guide track 98 to prevent the hinged cover 62 from closing as is shown most clearly in Figures 2 and 3. As the coffee brewing cylinder 54 approaches the 12 o'clock or upright position, a yoke member 102 which is pivotally secured to and surrounds the coffee brewing cylinder 54 contacts a downwardly extending bar 104 which is pivotally secured to the slidably mounted cut-off 46 beneath the measuring cup 34 as is shown most clearly in Figures 2 and 3. As the plate 66 continues to revolve the cut-off bar 104 moves to the left being carried along by the yoke 102, thus moving the opening 50 of the cut-off 46 directly underneath the bottom of the measuring cup 34 (this being the solids-receiving position), so that the coffee contained in the measuring cup 34 flows by gravity down into the coffee brewing cylinder 56, thus discharging an exactly measured portion of coffee into the coffee brewing cylinder or container 56. In order to prevent too much coffee from flowing into the coffee brewing cylinder 56 from the coffee dispenser 28 while the coffee brewing cylinder is beneath the measuring cup 34, the cut-off 36 has been provided in the bottom of the coffee dispenser 26. The cut-off 36 rotates along with the plate 66 being mechanically connected therewith by means of a driving gear 108, the shaft of which is directly connected to a pair of miter gears 110. The miter gears 110 are directly connected to the previously described gear train 40 which moves the cut-off 36 in synchronization plate 66, i. e. the cut-off 36 makes exactly one revolution each time the plate 66 makes one revolution, the whole being so arranged that each time the cut-off 46 beneath the measuring cup 34 is open so that the coffee pours from the measuring cup 34 into the coffee brewing cylinder 56, the cut-off 36 in the bottom of the coffee dispenser 26 covers the opening 32 in the plate 30 at the bottom of the coffee dispenser 26, so that no coffee may flow from the coffee dispenser 26 into the measuring cup 34 at that particular time. It will thus be seen that I have provided means whereby an exactly measured charge of ground coffee and no more flows into the coffee brewing cylinder 56 each cycle of the coffee brewing mechanism.

As the coffee brewing cylinder 56 continues to move to the left and downwardly in the path of its rotation, the yoke 102 loses contact with the downwardly extending bar 104 on the cut-off 46, and at this time the slidably mounted cut-off 46 moves to the right since it is spring biased by means of the coil springs 112 thus again closing off the bottom of the measuring cup 34, which has now completely emptied its contents into the coffee brewing cylinder 56. Continued rotation of the plate 66 causes the cut-off 36 in the bottom of the coffee dispenser 26 to rotate thereby again uncovering the opening 32 in the plate 30 at the bottom of the coffee dispenser 26 thus allowing a fresh charge of ground coffee to flow down and again fill the measuring cup 34, so that the entire operation may again be repeated, the coffee brewing cylinder thus receiving exactly the same charge of ground coffee each time it passes beneath the measuring cup 34, as long as desired. Provision has also been made for operating the mechanism without allowing the ground coffee to flow into the coffee brewing cylinder 56, as this is especially useful when it is desired to run the mechanism through its cycle of operation without making coffee as for cleaning and like operations. This has been accomplished by mounting the downwardly extending bar 104 on a pivotally mounted cam member 114, so that when the operator desires to run the machine through its cycle of operation without coffee in the coffee brewing cylinder 56 it is only necessary to pull out the button 116 which is connected by means of a wire 118 to the pivotally mounted cam member 114 thus causing it to swing the downwardly extending bar 104 forward so that it can no longer be contacted by the yoke 102 as the coffee brewing cylinder 56 swings into the vertical position, thus preventing the cut-off 46 underneath the measuring cup 34 from opening and filling the coffee brewing cylinder 56 with ground coffee, the remainder of the cycle of operation remaining unchanged. When it is desired to again brew coffee with the machine, the operator need only push in the button 116 thereby causing the downwardly extending bar 104 to lie in the path of rotation of the yoke 102 so that the coffee brewing cylinder 56 will again be filled with a fresh charge of ground coffee each time it moves to solids-receiving position, that is under the measuring cup 34.

As the coffee brewing cylinder 56 continues to rotate filled with its measured charge of ground coffee, the pin 100 on the top of the hinged cover 62 reaches the end of the guide track 98, and the hinged cover is urged forward and continues to fall by gravity thus snapping shut the cover 62 over the top of the coffee brewing cylinder 56. A water and air tight fit is provided by suitable sealing means, such as, for example, the gasket member 122 secured to the hinged cover member 62 so that the coffee brewing cylinder 56 will not leak during the coffee brewing operation. In order to secure a perfectly tight fit and also to resist pressures created in the coffee brewing cylinder 56 during the coffee brewing period the pivotally mounted yoke 102 carries an extended arm 124 at the bottom end thereof. The arm 124 operates in a suitable guide 126 and is spring biased outwardly by means of the flat spring 128 as is shown most clearly in Figures 2 and 3. As the hinged cover 62 closes over the top of the coffee brewing cylinder 56 the end of the extended arm 124 contacts an inwardly curved guide member 130a which causes the extended arm 124 to move rearwardly in the guide member 126, which in turn causes the pivotally mounted yoke member 102 to move forward. As the yoke 102 moves forward, notches 132 which are cut in the top thereof engage pin members 134 which are fixedly secured to the hinged cover member 62, as is shown most clearly in Figures 2, 3 and 7, and force the cover member 62 tightly down against the top of the coffee brewing cylinder 56, thus forming a completely air and water tight joint and also serving as latching means to hold said cover 56 tightly in place during the coffee brewing operation.

At this point the coffee brewing cylinder 56 has reached approximately the nine o'clock position as shown by means of the mainly horizontal dotted lines in Figure 3 and it is in this position that the coffee in the coffee brewing cylinder 56 is infused or brewed. Rotation of the coffee brewing cylinder 56 automatically stops in such brewing position while the brewing operation is completed. This may be accomplished by the following means; as the coffee brewing cylinder 56 reaches the nine o'clock position a pivoted lever arm 136 moves into a notch 130 cut in the edge of the revolving plate 66 at the rear as is shown in Figures 3 and 5 the latter being a rear view of the plate 66. The pivoted lever arm 136 is fixedly secured to a shaft 140 to which a second lever arm 142, which carries the electrical contact 94, is also fixedly secured as is shown most clearly in Figures 2 and 4. When the lever arm 136 moves into the notch 130 in the revolving plate 66 it causes the lever arm 142 to move downwardly which carries the movable electrical contact 94 away from the fixed electrical contact 91 thus breaking the electrical circuit and thereby causing the motor 68 to stop running and thus stopping the rotation of the revolving plate 66 and the coffee brewing cylinder 56 which it carries.

The coffee brewing operation is carried out automatically by the following means: The plate 66 is rotatably mounted on a shaft which is part of a valve mechanism and comprises essentially a rotary valve and which has been designated generally by the reference numeral 144 and which has been shown in detail in Figure 6. The revolving plate 66 is mounted on a centrally located shaft portion 146 which is hollow in that it has an opening 148 bored along its longitudinal axis, the opening 148 extending rearwardly to a point adjacent the middle of the shaft 146 and there communicating with a second opening 150 in the shaft bored at right angles to the opening 148, as is shown most clearly in Figure 6. The shaft 146 revolves inside the valve member 144 and is made water tight by any suitable means, such as, for example, the pressure plate 152 or any other suitable means. A suitable opening 154 extends through the side of the wall of the rotary valve 144, and when the coffee brewing cylinder 56 is in the coffee brewing position the openings 150 and 154 are in exact alignment. The opening 154 communicates by suitable means such as the tube 156 with a suitable source of hot water as the diffusing liquid, such as, for example, the hot water tank 158 which may be conveniently placed in the base section 22 of the new and novel coffee brewer of my invention. The water for the hot water tank 158 may be conveniently provided by a suitable tube 160 connected to a suitable source of water. If desired, the water may run into a filter of conventional design which has been indicated by the reference numeral 162, the filter 162 having a suitable drain plug 164, for cleaning purposes as is shown most clearly in Figure 4. A pressure reducing valve 166 of conventional design is used to reduce the pressure of the water in the tank so that the coffee brewing operation may be carried out at a suitable coffee making pressure. The pressure reducing valve 166 may be connected to the hot water tank 158 by any suitable means such as the tube 168. The water in the hot water tank 158 may be heated by any suitable means such as, for example, electrical heating units (not shown) connected to the source of electricity 96.

When the previously described openings 150 and 154 are aligned water flows from the hot water tank 158 through the tube 156 into the opening 154 and from there to the hole 148 which communicates with the perforated tube 60 extending into the coffee brewing cylinder 56. Hot water then flows through the perforations 170 in the tube 60 under pressure and thoroughly steeps and brews the ground coffee contained in the coffee brewing cylinder 56, removing all of the essential oils and flavors to make delicious brewed or coffee infusion. The brewed coffee then passes out through the fine filter screen 58 which serves to separate the coffee grounds or dregs from the infusion and retain the coffee grounds inside the coffee brewing cylinder 56. The brewed coffee then is forced by the water pressure out through the spigot 64 in the bottom of the coffee brewing cylinder 56.

Beneath the spigot 64 is placed a suitable container which has been designated by the reference numeral 172 and which rests upon a suitable movable plate 174, which in turn rests upon suitable arms 176 fixedly secured to a pivotally mounted rod 178. A lever arm 180 is fixedly secured to the end of the pivotally mounted rod 178 and carries thereon a slidably mounted weight which has been designated by the reference numeral 181. A push rod 182 contacts the end of the lever arm 180 as the end toward which the slidably mounted weight 181 is placed, the opposite end of the push rod 182 contacting the previously described pivotally mounted lever arm 142 which carries the electrical contact 94. As hot water continues to flow through the ground coffee and the brewed coffee passes through the spigot 64 and down into the container 172, its weight increases, and at a pre-determined weight the movable plate 174 presses down on the arms 176 with sufficient force to cause the slidably mounted weight 181 and the lever arm 180 which carries it, to move upward against the push rod 182, causing said push rod to move upwardly and actuate the previously described pivotally mounted lever arm 142 which carries the electrical contact 94. As the lever arm 142 continues to rise the electrical contact 94 presses against the electrical contact 91 causing the motor 68 to revolve which in turn, as already described, causes the revolving plate 66 to rotate thus carrying the coffee brewing cylinder 56 around with it. As rotation continues the opening 150 moves out of alignment with the opening 154 thus effectively shutting off the flow of hot water into the coffee brewing cylinder 56, and thus the coffee brewing operation is completed and has been shut off automatically. It will be noted from the above that I have provided a simple and effective method of regulating the strength of the brewed coffee. The strength of the brewed coffee may be easily and quickly regulated by moving the slidably mounted weight 181 either nearer or farther from the fulcrum of the lever arm 180 which is at the pivotally mounted rod 178, which in turn regulates the amount of weight necessary to depress the arms 176 so as to move the electrical contacts 94 and 91 together in order to close the electrical circuit and start the motor running again. Thus, if the slidably mounted weight 181 is moved farther away from the rod 178 more weight in the container 172 is required to close the electrical circuit and start the motor 68 running again, hence the brewed coffee will be weaker since more hot water has run through the measured amount of ground coffee contained in the coffee brewing cylinder 56. Conversely, if the slidably mounted weight 181 is moved closer to the pivot rod 178, less weight of brewed coffee is required to close the electrical circuit and start the motor 68 to turning, hence the coffee will be stronger since a lesser amount of hot water has passed through the measured amount of ground coffee in the coffee brewing cylinder 56, by the time that the electrical circuit has closed and the coffee brewing cylinder 56 has moved out of the coffee brewing position.

As the coffee brewing cylinder 56 continues to rotate after the coffee brewing position, the extended arm 124 on the pivotally mounted yoke 102 moves out of contact with the inwardly curved guide member 130a, and the spring 128 moves the extended arm 124 outwardly causing the pivoted yoke member 102 to which it is attached to move rearwardly thus disengaging the notches 132 from the pin members 134 which are secured to the hinged cover member 62, thus unlatching the said hinged cover member. The pull of gravity then causes the hinged cover member to drop downwardly, thus uncovering the coffee brewing cylinder 56 so that the coffee grounds or dregs may drop out of the coffee brewing cylinder 56 and fall down onto a chute indicated by the reference numeral 184 where they fall by gravity into a suitable trap 186 having a screen bottom 188 where the water drains from the coffee grounds leaving the coffee grounds behind. From time to time as required the coffee grounds may be emptied from the trap 186.

As the coffee brewing cylinder 56 reaches the seven o'clock position the opening 150 in the rotating shaft 146 which carries the revolving plate 66 is aligned with an opening 190 through the wall of the rotary valve 144. The opening 190 communicates with the water supply by means of a tube 192 which connects with a T fitting 194 in the water supply tube 160 as shown most clearly in Figure 4. This water which is under considerable pressure then flows through the opening 190, into the opening 150 and thence into the opening 148 where it then flows into the perforated tube 60 which extends into the coffee brewing cylinder 56. There is thus provided automatic cleaning for the coffee brewing cylinder 56 which is thoroughly flushed out by the water which is under considerable pressure and the entire coffee brewing cylinder 56, its screen 58 and its hinged cover 62 are thoroughly washed off and cleaned preparatory to the next operating cycle of the machine. As the revolving plate 66 carrying the coffee brewing cylinder 56 continues to rotate the opening 150 moves out of alignment with the opening 190 so that the cleansing water is shut off until the next cycle of operation.

As the coffee brewing cylinder 56 continues to rotate it reaches the five o'clock position from where the operating cycle started as shown by the dotted lines in Figure 3. At this point a second pivoted lever arm 196 moves into the previously described notch 130 which is cut in the edge of the revolving plate 66. The pivoted lever arm 196 is fixedly secured to a shaft 198 to which the previously described pivoted handle member 82 is also fixedly secured. The handle member 82 is biased upwardly by suitable means, such as, for example, the coil spring 200 one end of which is secured to a bolt 202 and the other end to the handle member 82. The biasing spring 200 urges the pivoted lever arm 196 into the notch 138 in the revolving plate 66 and when this occurs the handle 82 is moved upwardly, and the rider 84 also moves upwardly, causing the electrical contact 80 to move away from the electrical contact 88 and thus breaking the electrical circuit and thereby stopping the motor 68 which shuts off the entire mechanism until it is again desired to operate the coffee brewing machine. When it is desired to repeat the cycle of operation it is merely necessary to again close the switch 86 which again starts the motor 68 and the device goes through the same sequence of operations just described.

If desired, suitable warming plates 204 may be built into the front of the machine so that the brewed coffee from the machine may be kept hot. These warming plates may be of conventional design as is well known to those skilled in the art to which this invention pertains. The warming plates may be connected to the source of electrical energy 96 and if desired, suitable off-on switches 206 may be provided for each warming unit so that one or both of either of the warming plates may be on as desired by the operator of the machine.

From prolonged experimentation I have discovered that by using the coffee brewing machine of the present invention that considerable economies may be effected. For example, experiments have shown that from twenty to thirty more cups of coffee per pound are obtained than by the use of present-day methods. Further, the coffee brewed by this machine has superior taste and flavor qualities, the method employed in brewing the coffee apparently extracting more of the essential oils and flavors from the ground coffee than conventional present-day methods so that coffee of far superior taste and flavor is produced. Further, using the machine of the present invention, the operator has at finger tip control a method of varying the strength of the coffee as desired since by merely shifting the slidably mounted weight 181 closer or further away from the fulcrum of the lever 180 provides coffee of greater or less strength as desired.

While I have described the present invention in great detail and have shown a preferred and practical method of accomplishing the same, it is to be understood that various changes may be made in the shape, size and operation of the various parts, and that various equivalent mechanisms may be used without departing from the spirit of my invention or the scope of the appended claims.

Having thus described my invention, what I claim and desire to secure by Letters Patent is:

1. In an infusion apparatus, a container open at one end having a closure for that end displaceable from a closed to an open position; a plate carrying said container with its open end adjacent the periphery thereof; means to rotate said plate and thereby move said container successively through a solids-receiving position, a brewing position and an inverted cleansing position; mechanism to close the closure through movement of the plate to the brewing position; means operable through the said movement for the introduction of an infusing liquid into the container through a wall thereof; means in the receptacle to separate the infusion from the solids; means to dispense the infusion from the receptacle; and said closure being mounted for opening through movement of the plate from the brewing to the cleansing position for the discharge of dregs from the inverted container.

2. An infusion apparatus according to claim 1, having means operable through the last-mentioned movement to flush said container.

3. In an infusion apparatus, a container open at one end having a closure for that end displaceable from a closed to an open position and mounted for opening the container when inverted, a plate carrying said container with its open end adjacent the periphery thereof; means to rotate said plate and thereby move said container successively through a solids-receiving position, a brewing position and an inverted cleansing position; mechanism operable to latch the closure to the container in closed position through rotation of the plate to brewing position; means operable through said rotation for the introduction of an infusing liquid through a wall thereof; means in the receptacle to separate the infusion from the solids; means to dispense the infusion from the receptacle; and means operable through rotation of the plate from brewing to inverted cleansing position to release said mechanism, so that opening of the closure may be effected for discharge of dregs from the inverted container.

4. An infusion apparatus according to claim 3 having means operable through the last-mentioned rotation to flush said container.

5. An infusion apparatus according to claim 3 having means operable to maintain said closure open through the rotation of the plate returning said closure from cleansing position to solids-receiving position for a succeeding operation.

6. An infusion apparatus according to claim 3, having means to rotate said plate which includes a hollow shaft constituting part of valve mechanism through which the infusing liquid is introduced.

7. An infusion apparatus according to claim 3, having means to discharge a predetermined quantity of solids into the open end of the container, and said mechanism including a latch member rotatable with the plate and container, functioning to engage and actuate the last-mentioned means.

8. An infusion apparatus according to claim 3, having a device to dispense a predetermined quantity of solids into said container, said latch mechanism having a lever pivoted to said container, interengaging means between said closure and lever, said device being in the path of movement of the lever so as to be actuated thereby, and means to tilt the lever through rotation of the plate from brewing position to release interengagement with said closure.

9. An infusion apparatus according to claim 3 having means movable through the weight of infusion dispensed from said container to effect return rotation of the plate from cleansing position to solids-receiving position.

10. An infusion apparatus according to claim 3 having a movable member engageable by a receptacle disposed to receive infusion dispensed from said container, mechanism operable by movement of the last-mentioned member under the weight of the infusion received thereby to effect return rotation of the plate, and said means to rotate said plate including a hollow shaft constituting part of valve mechanism through which the infusing liquid is introduced.

References Cited in the file of this patent

UNITED STATES PATENTS

| | | |
|---|---|---|
| Re. 22,879 | Peters et al. | May 13, 1947 |
| 1,455,975 | Spencer et al. | May 22, 1923 |
| 1,612,410 | Bellvis et al. | Dec. 28, 1926 |
| 1,668,540 | McAllen | May 1, 1928 |
| 1,804,795 | Lee | May 12, 1931 |
| 1,993,609 | Kennedy | Mar. 5, 1935 |
| 2,012,645 | Thomas | Aug. 27, 1935 |
| 2,014,325 | Grilli | Sept. 10, 1935 |
| 2,192,095 | Meyers | Feb. 27, 1940 |
| 2,236,059 | Heuser | Mar. 25, 1941 |
| 2,340,758 | Kappenberg et al. | Feb. 1, 1944 |
| 2,414,185 | Andrews | Jan. 14, 1947 |
| 2,547,067 | Waline | Apr. 3, 1951 |
| 2,592,761 | Svendsgaard | Apr. 15, 1952 |